United States Patent [19]

Murata

[11] Patent Number: 4,984,091
[45] Date of Patent: Jan. 8, 1991

[54] APPARATUS FOR PHOTOGRAPHING OR PROJECTING AN IMAGE FOR A CRT OR LASER DIODE ARRAY

[75] Inventor: Masanao Murata, Hachioji, Japan

[73] Assignee: Olympus Optical Co., Ltd., Tokyo, Japan

[21] Appl. No.: 199,741

[22] Filed: May 27, 1988

[30] Foreign Application Priority Data

May 29, 1987 [JP] Japan .................. 62-136980

[51] Int. Cl.$^5$ .................................. H04N 5/84
[52] U.S. Cl. .................................. 358/244
[58] Field of Search ............ 358/244, 244.1, 244.2, 358/334, 335, 906, 909, 300, 88, 65, 347, 487, 54, 494; 360/35.1

[56] References Cited

U.S. PATENT DOCUMENTS

| | | | |
|---|---|---|---|
| 3,893,174 | 7/1975 | Sano et al. | 358/65 |
| 4,520,472 | 5/1985 | Reno | 358/347 |
| 4,541,007 | 9/1985 | Nagata | 358/88 |
| 4,627,004 | 12/1986 | Cool et al. | 358/244 |
| 4,653,884 | 3/1987 | Johnson et al. | 358/244 |
| 4,685,000 | 8/1987 | Barrett | 358/244 |
| 4,733,064 | 3/1988 | Ishikawa | 358/481 |
| 4,771,343 | 9/1988 | Takenaka | 358/335 |
| 4,780,756 | 10/1988 | Shiota et al. | 358/244 |

FOREIGN PATENT DOCUMENTS

61-113029  5/1986  Japan .

*Primary Examiner*—Donald McElheny, Jr.
*Attorney, Agent, or Firm*—Armstrong, Nikaido, Marmelstein, Kubovcik & Murray

[57] ABSTRACT

In an imaging apparatus, the position of an image displayed on the display screen of a display device is stepwise shifted by a device for effecting stepwise time-shifting of the time of an input video signal or a synchronizing signal. The shifted image is focused or projected while the position of the shifted image on a sensitizing surface or a projection surface is being shifted by a position shifting circuit.

12 Claims, 10 Drawing Sheets

APPARATUS FOR PHOTOGRAPHING OR PROJECTING AN IMAGE FOR A CRT OR LASER DIODE ARRAY

FIELD OF THE INVENTION AND RELATED ART STATEMENT

The present invention relates to an image photographing and projecting apparatus which is capable of realizing image photography or projection with increased resolution.

Conventional, types of photographic apparatuses for photographing and for making a high-quality color hard copy of an image reproduced on the face of a color display uses either a method of using a high-resolution monochrome display and photographing an image reproduced on the monochrome display in the three colors R, G and B in a time-sharing manner or a method of directly photographing the face of a color display. The former method which causes the monochrome display to emit light three times through an R, G and B color filter device enables production of high-quality images, but requires a motor mechanism for rotating the R, G and B color filter device. As a result, there has been a tendency for such an apparatus to have a structure that is excessively large, costly and overcomplex.

On the other hand, a method of directly photographing an image reproduced on the face of a color display does not require any mechanism for rotating the R, G and B color filter device. However, the size of each of the color elements corresponding to the R, G, and B colors presents a substantial problem, particularly with respect to color cathode ray tubes (CRTs) having faces provided with black matrix patterns for the purpose of improving contrast. For example, these black matrix patterns may appear as distinct fixed patterns. If an image reproduced on the face of such a color CRT is enlarged to a great extent, a picture image may be produced in which it is difficult to identify the object. This problem will be further described below with reference to FIGS. 1 and 2.

Figure 1:
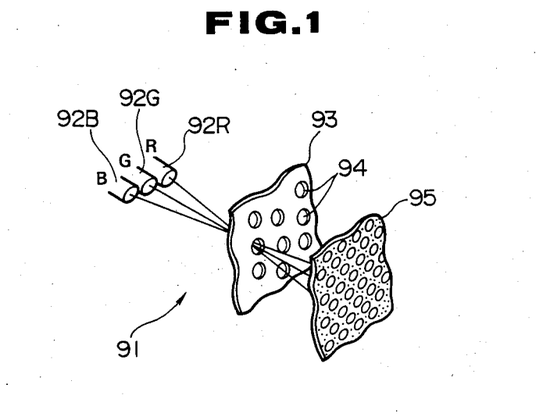
FIG. 1 is a schematic illustration of the essential portion of the internal structure of a typical color CRT.

Referring to FIG. 1, in the interior of a color CRT 91, electron beams emitted from three R, G and B electron guns 92R, 92G and 92B pass through a target of apertures 94 formed in a shadow mask 93 and is subjected to color separation. The three electron beams which have passed through the target aperture 94 in the shadow mask 93 strike R, G and B phosphor dots on a CRT face (phosphor dot screen) 95, thereby causing each of them to emit light. It is to be noted that the portion of the CRT face 95 that is devoid of the R, G and B phosphor dots is coated with a black film called a black matrix.

An image displayed on the color CRT 91 is photographed by exposing a film to the colored light emitted from the CRT face 95. If the CRT face 95 is photographed directly, the pattern of the black matrix of the CRT 95 appears on the photograph. Consequently, the degree of resolution of the color CRT 91 is determined by the pitch of the black matrix.

The above description applies to a projector apparatus (such as video projectors) employing color CRTs. For example, if an image is projected onto a projection screen in an enlarged manner, picture elements which constitute the image are also projected onto the projection screen; the result is that observers will have difficulty in identifying the object represented by the image.

As described above, if an image is enlarged or projected on an enlarged scale in a photographic apparatus or projector apparatus, portions, such as the black matrix between each adjacent picture element, will appear and this makes it difficult to identify the object.

The following description is made in conjunction with a photographic apparatus, but is also applicable to a projector apparatus assuming that a screen is substituted for the film plane of the photographic apparatus.

The following description refers to a single signal for better understanding, but it will be understood that, if three R, G and B signals are simultaneously processed in a manner which will be described below, a full-color image can be provided on a color CRT.

Figure 2:
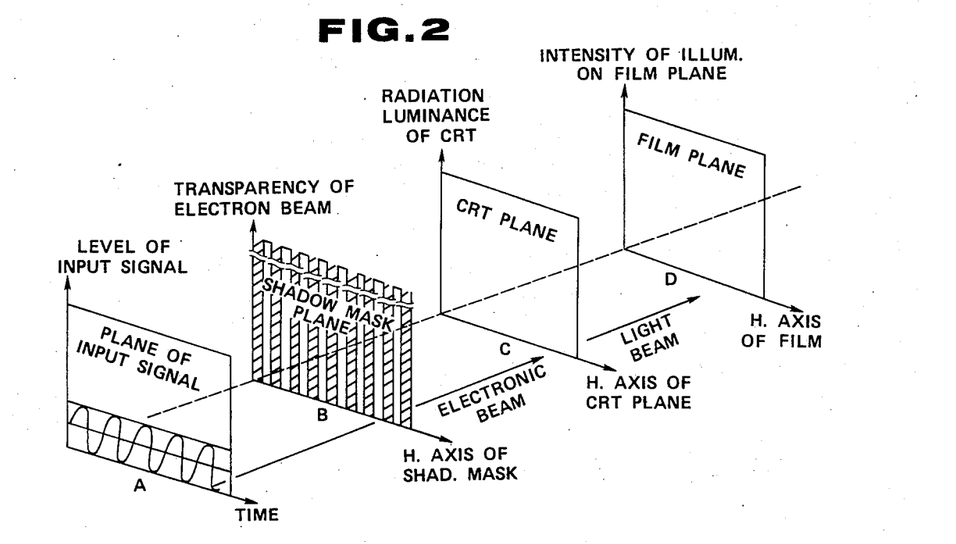
FIG. 2 is an correlation diagram illustrating image information in an example of the related art.

FIG. 2 shows the flow of image information during the process from the input of signals to imagewise exposure on a film in conventional photography. In FIG. 2, symbol A represents an input-signal plane, symbol B represents a shadow-mask plane, symbol C represents a CRT plane, and symbol D represents a film plane. Photography employing the conventional color CRT is represented as the transmission of information through planes A, B, C and D.

In the plane A, an input signal entering the CRT is defined as a time-axis element and an input-amplitude element. The signal defined in the plane A is converted into an electron beam and is transmitted to the shadow-mask plane B. The function of the shadow-mask plane B is defined by the CRT horizontal element of the CRT and the transparency of the electron beam. The shadow mask B serves as a barrier having slits with respect to the input signal, and functions to sample the input signal. An electron beam which has been sampled by the shadow-mask plane B is transmitted to the CRT plane C. The function of the CRT plane C is defined by the CRT horizontal element of the CRT and the radiation luminance of the CRT, and the CRT exhibits luminance at a level that accords with the level of the electron beam which has been sampled by the plane B. The luminance generated on the CRT is transmitted through a light beam to the film plane D as a recording medium. The function of the film plane D is defined by the horizontal-axis element of the film and illumination on the film plane D. In the film plane D, therefore, the amount of exposure corresponding to the level of luminance transmitted from the CRT plane is obtained.

Figure 3:
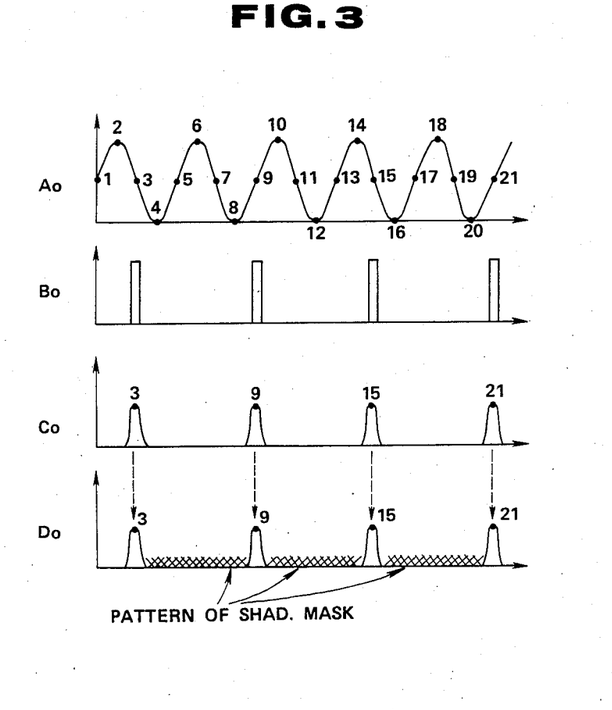
FIG. 3 is an illustration showing the intensity distribution along each of the planes shown in FIG. 2.

FIG. 3 shows the above-described flow in graphic representation. (FIG. 3 will also be used in a subsequent description relating to a first embodiment of the present invention.) In FIG. 3, parts $A_0$, $B_0$, $C_0$, and $D_0$ correspond to the planes A, B, C and D, respectively.

As can be seen from FIG. 3, an input signal provided at $A_0$ is sampled by the slit-shaped apertures in the shadow mask represented at $B_0$, and is thus converted into a form such as shown in the part $C_0$. Therefore, it will be understood that the degree of resolution of the color CRT is determined by the pitch of the shadow mask and that, if the frequency to be reproduced is higher, a finer shadow-mask pitch is needed. In addition, since the portion between each adjacent exposed portion in the plane $D_0$ of FIG. 3 is covered by a black matrix portion, the black matrix portion is reproduced as a fixed pattern on the film.

Therefore, the above-described conventional type of photographic apparatus has had the disadvantage that the degree of resolution is limited by such a fixed pattern. Accordingly, if it is desired to reduce the size of the apparatus for photographing or projecting a visual color display, it has been necessary to use a small color display which is inferior in resolution to a large color display because of limitations upon the working of color elements in the production process.

OBJECT AND SUMMARY OF THE INVENTION

It is therefore an object of the present invention to provide an image photographing and projecting apparatus capable of producing a high-resolution image from which its fixed pattern is erased.

It is another object of the present invention to provide an image photographing and projecting apparatus capable of producing a high-resolution image even if a color display of a low-resolution type is used.

To achieve the above and other objects, in accordance with one aspect of the present invention, there is provided an apparatus for photographing an image comprising a time shifting device for effecting stepwise time-shifting of the time of one of an input video signal and a synchronizing signal; an image displaying device for displaying the video signal stepwise time-shifted by the time shifting device on a display screen in the form of an image; a focusing optical system for focusing the image displayed by the image displaying device; a recording medium disposed with a sensitizing surface thereof being located in the focal plane of the focusing optical system; and a position shifting device for shifting, in synchronization with the time-shifting, the relative position of an image formed on the recording medium with respect to the position of the image displayed by the image displaying device.

In accordance with a second aspect of the present invention, there is provided an apparatus for projecting an image, comprising a time shifting means for effecting stepwise time-shifting of the time of one of an input video signal and a synchronizing signal; an image displaying device for displaying the video signal stepwise time-shifted by the time shifting device on a display screen in the form of an image; a projecting optical system for projecting the image displayed by the image displaying device; a screen disposed with a screen surface thereof being located in the focal plane of the projecting optical system; and a position shifting device for shifting, in synchronization with the time-shifting, the relative position of an image formed on the screen surface with respect to the position of the image displayed by the image displaying device.

In accordance with a third aspect of the present invention, there is provided a viewfinder apparatus comprising a time shifting means for effecting stepwise time-shifting of the time of one of an input video signal and a synchronizing signal; an image displaying device for displaying the video signal stepwise time-shifted by the time shifting device on a display screen in the form of an image; an eyepiece optical system disposed in opposed relationship with the display screen of the image displaying device for allowing observation of an object; and a position shifting device for shifting, in synchronization with the time shifting, the position of an image displayed on the display screen and observed through the eyepiece optical system.

BRIEF DESCRIPTION OF THE DRAWINGS

A better understanding of the present invention may be gained from the following detailed description, when read in connection with the accompanying drawings, in which:

FIGS. 7 to 12 are charts used for explaining the operation of effecting a time delay and horizontal shift in a stepwise manner by 1/an integer of the picture-element pitch of a display means in the first embodiment.

DETAILED DESCRIPTION OF PREFERRED EMBODIMENTS

Figure 4:
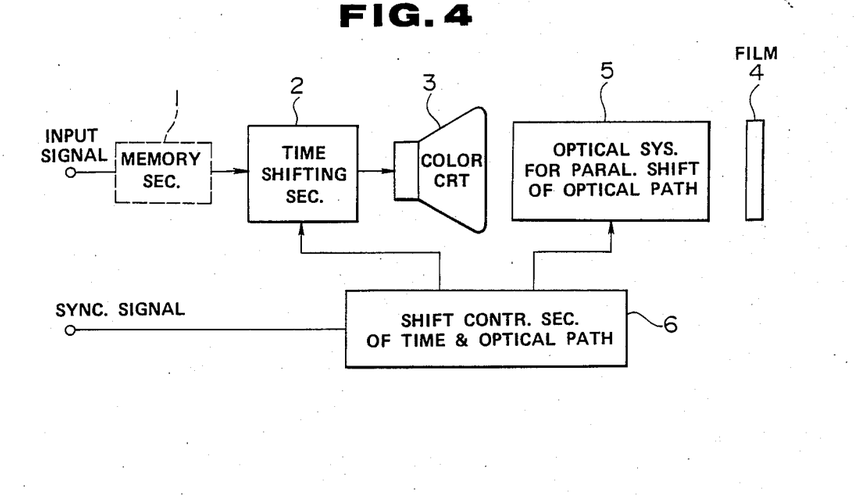
FIG. 4 is a block diagram showing the basic construction of the present invention.

FIG. 4 shows the diagrammatic construction of the present invention.

As illustrated, an input signal is passed through a memory section 1 which also enables the processing of motion images from input signals, and is input to a time shifting section 2. If a still image is to be processed, the input signal is directly supplied to the time shifting section 2. In the time shifting section 2, the input signal is periodically delayed or advanced by a very small time period Δt, and is then input to a color CRT 3. A parallel-shift optical system 5 for shifting an optical path in parallel with the horizontal direction is disposed between the color CRT 3 which emits light in response to the input signal and a photographic film 4, the optical system 5 having the function of shifting the optical path in parallel with the horizontal direction at a timing coinciding with the period of the above very short time period Δt. Light emitted from the color CRT 3 exposes the film 4 as a recording medium through the parallel-shift optical system 5.

The time shifting section 2 and the parallel-shift optical system 5 are controlled by a shift control section 6 which is arranged to output a control signal on the basis of an incoming synchronizing signal so as to control shifting of time and the optical path.

The operation of the present invention having the above-described construction will be described below with reference to FIG. 5.

Figure 5:
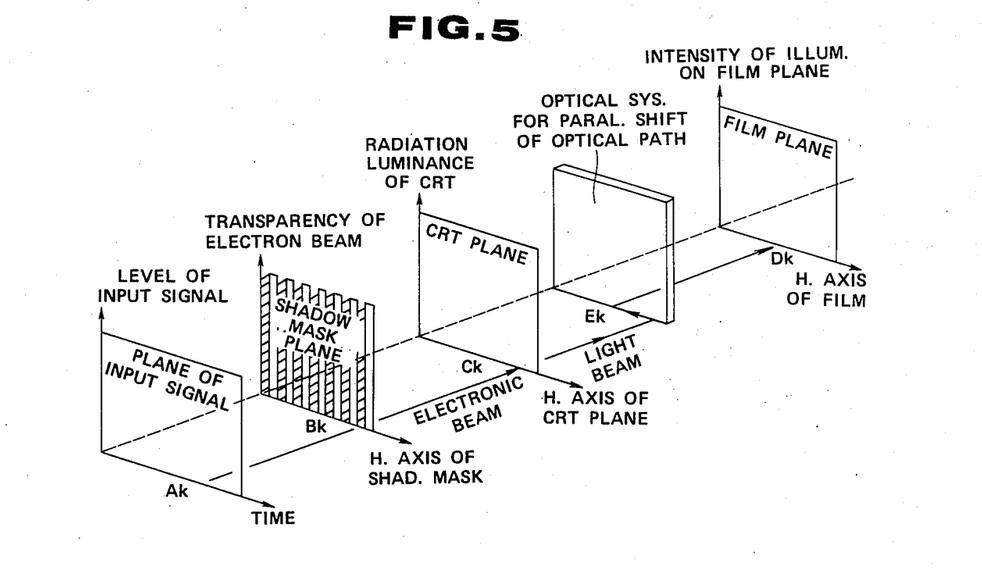
FIG. 5 is a correlation diagram illustrating image information in the present invention.

In the image correlation diagram shown in FIG. 5, symbol $A_k$ represents the plane of an input signal, symbol $B_k$ represents the plane of a shadow mask, symbol $C_k$ represents a CRT plane, symbol $D_k$ represents a film plane, and symbol $E_k$ represents a parallel-shift optical system for effecting parallel shift of an optical path. When compared with the prior art example shown in FIG. 2, the present invention is characterized in that the optical system 5 for sequentially shifting the optical path horizontally is interposed between the planes C and D.

In the arrangement shown in FIG. 4, an image is displayed in the following manner by picture elements which are grouped as units at a predetermined pitch. In the time shifting section 2, an image to be displayed is stepwise time-shifted by a time period equivalent to a fraction of the predetermined pitch, and the time-shifted image is input to and displayed in color on the color CRT 3. Simultaneously, the parallel-shift optical system 5 shifts the optical path of the image in parallel with the horizontal direction and in correspondence with the amount of time shift to focus the optical path onto the film 4. In consequence, a photographic image can be obtained in which the portion between each unit of picture elements is interpolated, whereby it is possible to eliminate a fixed pattern on the display screen of the color CRT 3 and hence to obtain a high-resolution photographic image.

In the conventional apparatus which merely photograph the face of a display as it is, reproduction of colors is effected by producing a half tone by adjustment of the intensity of emission of each R, G and B picture element used in computer graphics. Therefore, the minute structure of the image photographed by such a conventional apparatus is merely an aggregation of the minute R, G and B dots.

Unlike the conventional apparatus, the present inventive apparatus is arranged to effect exposure while overlapping the R, G and B dots. The quality of colors of an image reproduced in an exposed film is improved so that the range of color reproduction can be widened as compared with the conventional photography.

A first preferred embodiment of the present invention will be described below with reference to FIG. 6. An image photographing apparatus according to the first embodiment is indicated generally at 11, and R, G and B color signals input from respective input terminals are converted, for example, into n-bit quantized data in corresponding A/D converters 12 and are stored in frame memories (or field memories) 13R, 13G and 13B for storing R, G and B data, respectively.

A synchronizing signal SYNC is input to an H/V separating section 14, in which it is separated into a horizontal (H) synchronizing signal and a vertical (V) synchronizing signal. The horizontal synchronizing signal and the vertical synchronizing signal are input to a memory control section 15 and to a control section 16 for controlling a very short time (indicated by $\Delta t_k$) and a very short optical path (indicated by $\Delta x_k$). The memory control section 15 controls writing to and reading from each of the frame memories 13R, 13G and 13B. The $\Delta t_k \cdot \Delta x_k$ control section 16 controls a very short-time ($\Delta t_k$) delay section 17 to delay the data read from each of the frame memories 13R, 13G and 13B, periodically and in K steps (according to a frame period, in this example) with reference to the horizontal (H) synchronizing signal. The signals delayed in the $\Delta t_k$ delay section 17 are respectively supplied to R, G and B color compensators 18R, 18G, and 18B where these signals are subjected to gradation compensation as well as gray-balance compensation. Then, the signals thus compensated are supplied to corresponding D/A converters 19, in which they are converted into an analog form. Finally, the analog signals are input to a color CRT 21 and are displayed in color thereon.

The luminance on the CRT 21 is input through a lens 2 to a parallel-shift optical system 23 for shifting the optical path in parallel with the horizontal direction. The parallel-shift optical system 23 shifts the optical path in the horizontal direction, periodically and in K steps. Thus, the luminance output from the parallel-shift optical system 23 is projected onto a film 25 when a shutter 24 is opened.

It is to be noted that, in the R, G and B color compensators 18R, 18G and 18B, the above input signal is subjected to gradation compensation so that the gradation characteristics of the respective colors are optimized on the film 25, as well as to gray-balance compensation relative to the gradation levels of the respective R, G and B colors so that when the R, G and B inputs assume the same ratio, white may be reproduced on the film 25.

A light measuring device 26 is disposed in the vicinity of the film 25. The light measurement signal of the light measuring device 26 is input to an exposure control section 27, and the shutter 24 disposed ahead of the film 25 is opened for a proper exposure time to expose the film 25.

The parallel-shift optical system 23 is constituted by, for example, two rectangular prisms 28 and two piezoelectric elements 29 sandwiched between the prisms 28. The piezoelectric elements 29 can be varied in thickness in accordance with the signal level of the $\Delta x_k$ control signal from the $\Delta t_k \cdot \Delta x_k$ control section 16. Therefore, the spaces between the two rectangular prisms 28 at opposite sides thereof along the horizontal axis (along the vertical axis as viewed in FIG. 6) are changed in accordance with variations in the thickness of each of the piezoeletric elements 29 so that the input light is shifted by the amount equivalent to $\Delta x_k$ in the horizontal direction. In other words, voltages of different levels are stepwise applied to the piezoelectric elements 29 in synchronization with the aforesaid time shifting operation, thereby causing the optical path to be shifted in the horizontal direction.

The $\Delta t_k \cdot \Delta x_k$ control section 16 controls the parallel-shift optical system 23 interposed between the lens 22 and the shutter 24 so that the optical system 23 will be periodically shifted horizontally in synchronization with the $\Delta t_k$ delay.

The components of the parallel-shift optical system 23 are not limited solely to the above-described ones, and any material that can realize $\Delta x_k$-stepwise parallel-shift of the optical path in the horizontal direction may be employed.

In the above-described arrangement, an input signal which has been periodically time-delayed is input to the color CRT 21, and the luminance on the color CRT 21 is projected onto the film 25 while the parallel-shift optical system 23 is performing parallel shift of the optical path in synchronization with the period which has been time-delayed. Therefore, it is possible to photograph a high-resolution image containing no black matrix pattern even by means of the small color CRT 21 whose resolution is not so high.

The operation of the first embodiment having the above-described construction, that is, the flow of image information in photography using a film will be described in sequence with reference to FIGS. 7 to 12.

In FIGS. 7 to 12, planes $A_k$, $B_k$, $C_k$ and $D_k$ as well as an optical system $E_k$ (K=an integer of 0 to 5) correspond to the respective planes $A_k$, $B_k$, $C_k$, $D_k$ and $E_k$ which are shown in FIG. 5 in correspondence with the respective periods.

In the following description, it is assumed to input a signal having a long period as compared with the repetition frequency of the slits in the plane B of the shadow mask. The input signal is sequentially delayed by a time equivalent to 1/k of the period of the spatial frequency of the shadow-mask pitch, and is shifted horizontally by a distance equivalent to the 1/k period of the spatial frequency of the shadow-mask pitch.

By way of example, the following description refers to the case of K=5 in the embodiment described above.

Figure 7:
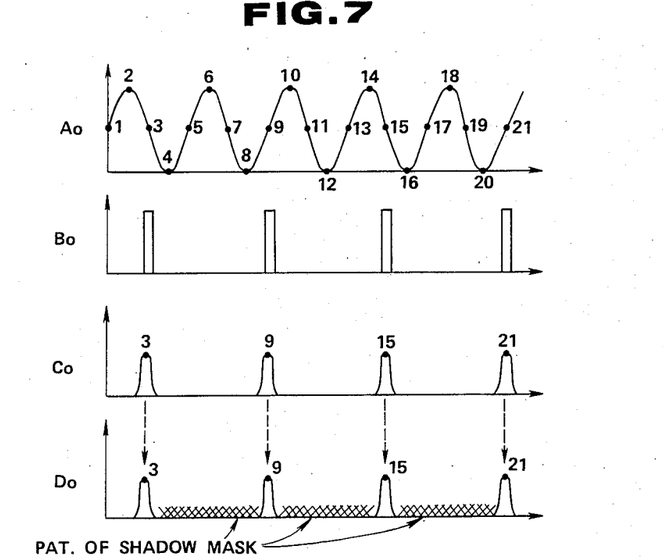
FIG. 7 is a chart illustrating the case where the amount of delay is zero.

In FIG. 7, a signal appearing in the input-signal plane $A_0$ is sampled by the slits in the shadow-mask plane $B_0$ and thus input signals 3, 9, 15 and 21 are sampled. The input signals 3, 9, 15 and 21 are projected onto the CRT plane $C_0$. The projected data causes the phosphor of the CRT to emit light, thereby producing luminance. The luminance is transmitted by a light beam and is passed through a parallel-shift optical system $E_0$ for effecting parallel shift of the optical path. The optical system $E_0$ has the function to shift the optical path horizontally in k steps, but it is assumed that no parallel shift is performed in the case shown in FIG. 7. Since the parallel shift is not performed, data corresponding to the input signals 3, 9, 15 and 21 is projected onto the film plane $D_0$ at respective positions thereof. (If only the operation shown in FIG. 7 is performed, a shadow-mask pattern will appear between each of the data 3, 9, 15 and 21. However, the shadow-mask pattern can be erased by the effect of the operation shown in FIGS. 8 to 12 which will be described later.)

Figure 8:
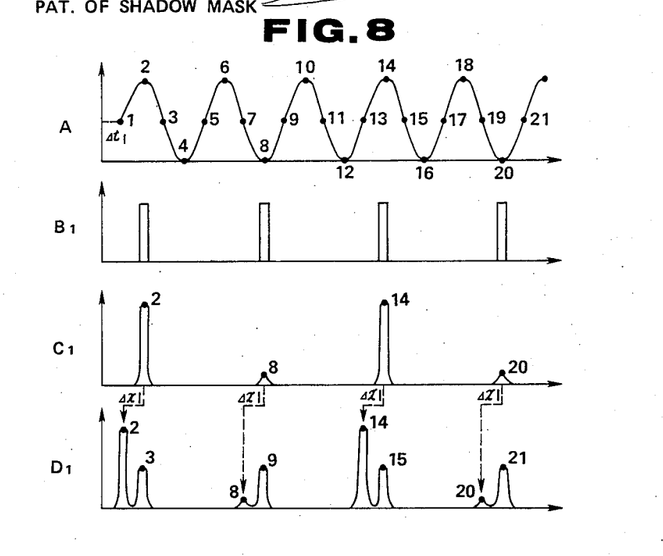
FIG. 8 is a chart illustrating a first amount of delay.

In the next period (k=1), as shown in FIG. 8, the same input signal which is delayed by $\Delta t_1$ with respect to the preceding period in the signal-input plane $A_0$ is generated in a signal-input plane $A_1$. Since a shadow-mask plane $B_1$ is fixed similarly to the plane $B_0$, input signals 2, 8, 14 and 20 are sampled by the slits in the shadow-mask plane $B_1$. The sampled signals are projected onto a CRT plane $C_1$ to cause the phosphor of the CRT to emit light, thereby providing luminance. The luminance is transmitted to a parallel-shift optical system $E_1$ by a light beam, and, after the optical path has been shifted by $\Delta x_1$ in parallel with the horizontal direction, passes through the optical system $E_1$. In this case, data corresponding to the input signals 2, 8, 14 and 20 is projected onto a film plane $D_1$ at respective positions thereon.

Figure 9:
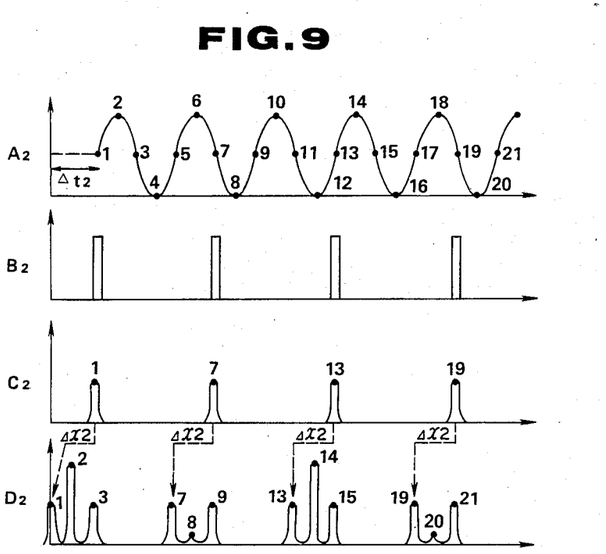
FIG. 9 is a chart illustrating a second amount of delay.

In the next period (k=2), as shown in FIG. 9, the same input signal which is delayed by $\Delta t_2$ with respect to the period in the input-signal plane $A_0$ is generated in an signal-input plane $A_2$. Since a shadow-mask plane $B_2$ is fixed similarly to the planes $B_0$ and $B_1$, input signals 1, 7, 13 and 19 are sampled by the slits in the shadow-mask plane $B_2$. The sampled signals are projected onto a CRT plane $C_2$ to cause the phosphor of the CRT to emit light, thereby providing luminance. The luminance is transmitted to a parallel-shift optical system $E_2$ by a light beam, and, after the optical path has been shifted by $\Delta x_2$ in parallel with the horizontal direction, passes through the optical system $E_2$. In this case, data corresponding to the input signals 1, 7, 13 and 19 is projected onto a film plane $D_2$ at respective positions thereon.

From the sequential viewing of the film planes D shown in FIGS. 7, 8 and 9, it will be understood that signals which were initially not resolved are gradually reproduced in the area of the black-matrix pattern.

Figure 10:
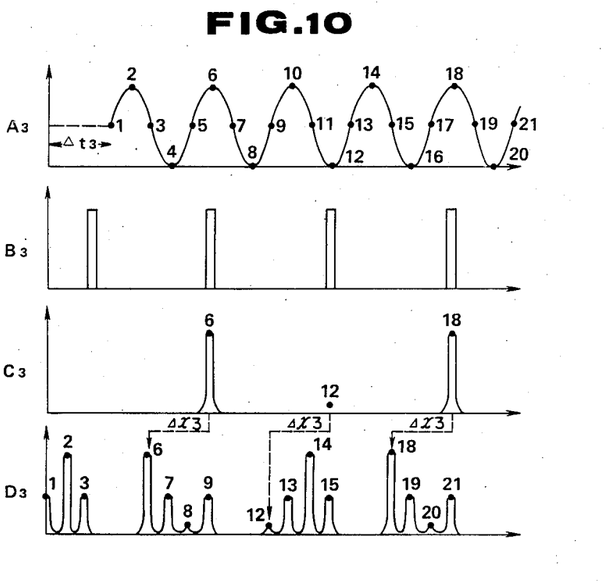
FIG. 10 is a chart illustrating a third amount of delay.
Figure 11:
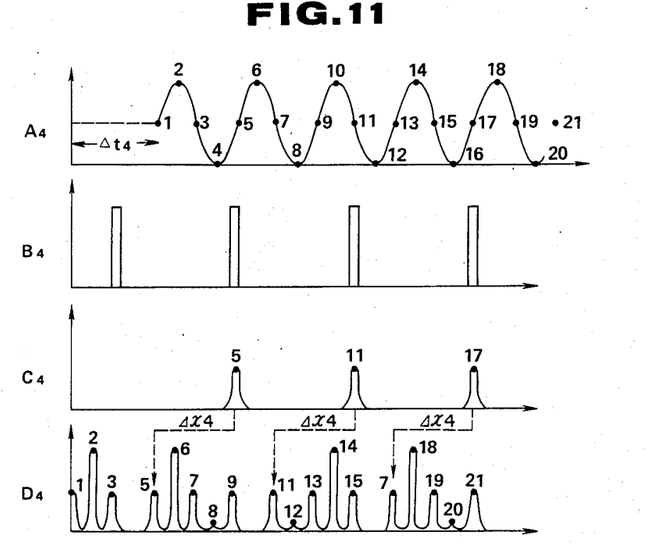
FIG. 11 is a chart illustrating a fourth amount of delay.

In the next period (k=3), as shown in FIG. 10, the same input signal is delayed by $\Delta t_3$ in a plane $A_3$ and, at the same time, the optical path is horizontally shifted by $\Delta x_4$ by a parallel-shift optical system $E_3$. Thus, data corresponding to input signals 6, 12 and 18 is projected onto a film plane $D_3$. In the next period (k=4), similarly, as shown in FIG. 11, the same input signal is delayed by $\Delta x_4$ in a plane $A_4$ and, at the same time, the optical path is horizontally shifted by $\Delta x_4$ by a parallel-shift optical system $E_4$. Thus, data corresponding to input signals 5, 11 and 17 are projected onto a film plane $D_4$.

Figure 12:
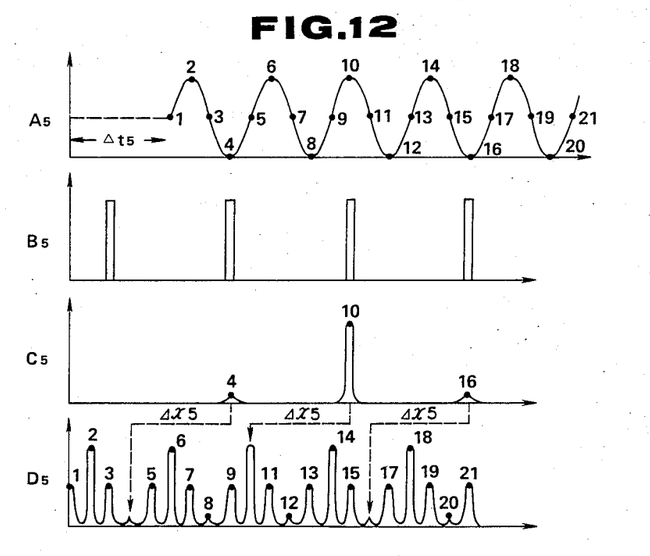
FIG. 12 is a chart illustrating a fifth amount of delay.

In the next period (k=5), similarly, as shown in FIG. 12, the same input signal is delayed by $\Delta x_5$ in a plane $A_5$ and, at the same time, the optical path is horizontally shifted by $\Delta x_5$ by a parallel-shift optical system $E_5$. Thus, data corresponding to input signals 4, 10 and 16 are projected onto a film plane $D_5$.

Finally, in the film plane $D_5$ shown in FIG. 12, input signals which were not able to be resolved in the film plane $D_1$ of FIG. 7 are resolved, and a black matrix pattern which appears in ordinary color photography of the CRT can be erased by virtue of smoothing realized by the average addition of the black matrix pattern on the film plane in the horizontal direction thereof.

The above description was made, by referring to FIGS. 7 to 12, with respect to an example in which a single input signal is photographed at high resolution with a fixed pattern being erased therefrom upon the principle of the present invention. It will be understood that the above procedure can be applied to a color CRT by independently and simultaneously effecting the above-described process upon R, G and B color elements.

When account is taken of the fact that the period of exposure time is equivalent to several frames, the period required to delay the $\Delta t_k$ and $\Delta x_k$ in K steps is preferably longer than the horizontal scanning period. In the above description made in conjunction with FIGS. 7 to 12, the input signal is sequentially delayed in the input-signal plane $A_k$. However, if the input signal is advanced in time in the plane $A_k$ and the optical path is shifted horizontally but in the reverse direction, similar effects can be provided. In addition, although the time shift and the parallel shift of the optical path are effected in K steps in the above embodiment, the time shift and the parallel shift may be effected in a stepless manner.

In the embodiment described above, a color CRT is employed as a display means for the purpose of illustration, but the display means is not limited solely to such a color CRT. For example, a liquid crystal display device, a plasma display device, a chromic display device, a phoshor display tube, an electroluminescence display, a light emitting diode device, a projector type CRT or the like may be employed.

Figure 6:
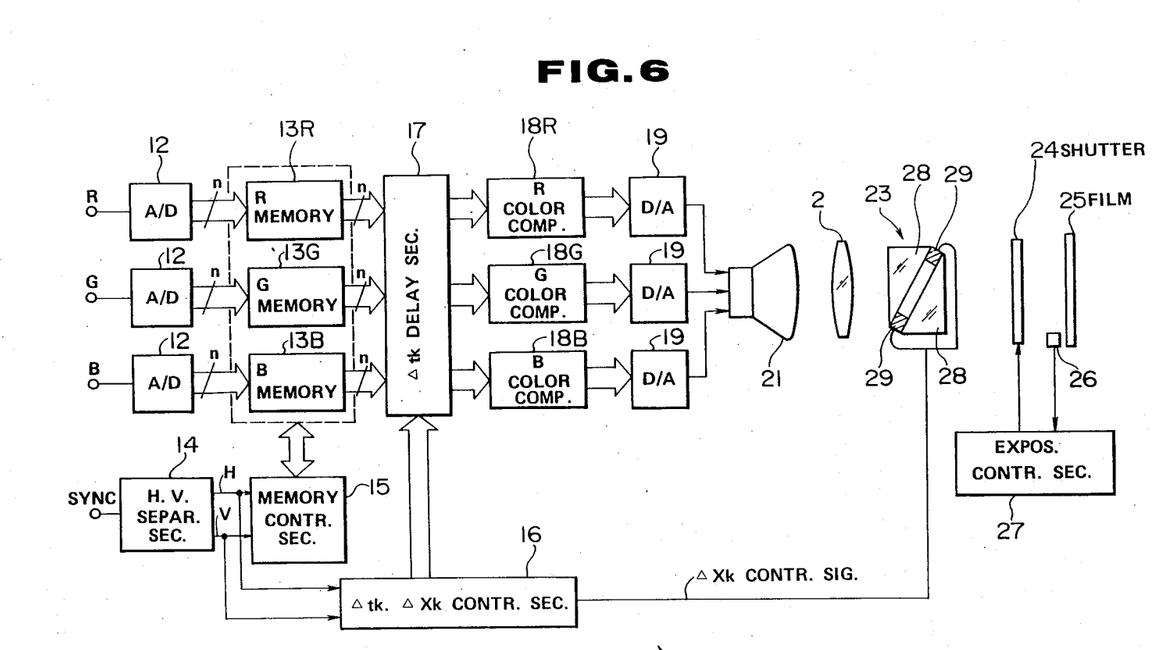
FIG. 6 is a block diagram showing the construction of a first embodiment of the present invention.

It is to be noted that the first embodiment shown in FIG. 6 is provided with memory means (for example, 13R, 13G and 13B) for temporarily storing an image signal so as to allow for the processing of a motion image. The resolution enhancement effect of the embodiment described above becomes small with respect to the processing of a motion image. However, the eyes of human beings are generally inferior in the ability to discriminate details of an object which is moving, but, in accordance with this embodiment, the resolution of a motionless portion in the motion image can be enhanced. Therefore, when an observer views the motion image, he looks at a motion image from which a fixed pattern such as a shadow mask has been erased and whose resolution has been enhanced on the entire image screen. It is to be noted that, if the present invention is applied to still image processing, the memory means need not necessarily be incorporated.

An endoscopic image is normally read from the memory means in the horizontal direction. If a switching means is used to swap horizontal and vertical address signals applied to the memory means, the present invention can be applied to the vertical read-out in place of the horizontal read-out, whereby it is possible to obtain an image the resolution of which is enhanced in the vertical direction.

In addition, after one cycle of photography has been completed in the manner which has been described in conjunction with the first embodiment, if the direction of read-out from the memory means is changed between horizontal and vertical directions and multiple exposure is effected by rotating the axis of the film 25 through 90°, it is possible to provide an image whose resolution has been enhanced with respect to the horizontal and vertical directions.

Although the optical path is shifted in the above-described embodiment, a recording medium (for example, a photographic film or a camera incorporating it) may be shifted. In other words, all that is required is to shift the display device and the photographic device with respect to each other, and, for example, the display device (e.g., the CRT) may be shifted.

Furthermore, in place of an image signal, a synchronizing signal may be shifted.

In place of the above-described piezoelectric elements, piezoelectric bi-morph elements, electrostriction elements or magnetostriction elements may be employed.

Figure 13:
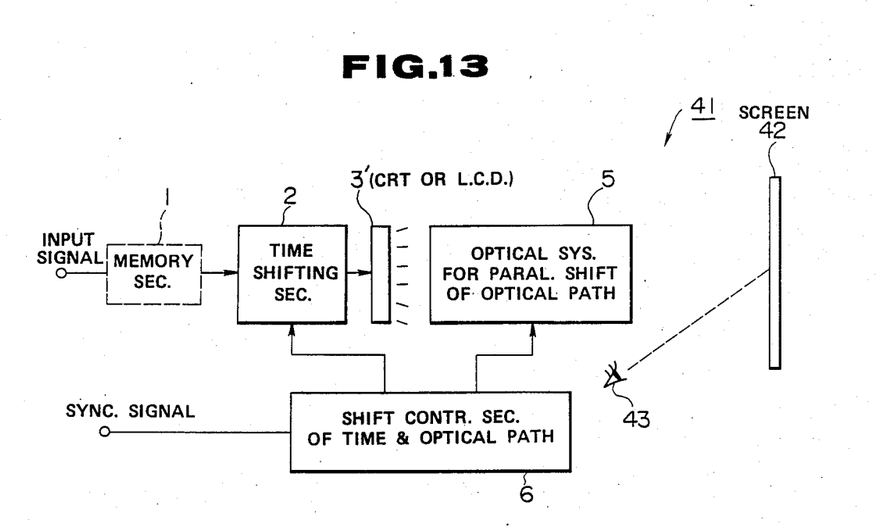
FIG. 13 is a block diagram showing the construction of a second embodiment of the present invention.

FIG. 13 shows a video projector 41 which is an image projecting apparatus according to a second embodiment of the present invention.

The apparatus according to the second embodiment has a construction similar to that shown in FIG. 4, and the video projector 41 is constituted by substituting a screen 42 for the film 4. An image projected onto the screen 42 can be observed with an naked eye 43. A light emitting device 3' may be the color CRT 3 or a liquid crystal display (LCD).

The principle of the apparatus shown in FIG. 13 is identical with that of the photographic apparatus 11 according to the first embodiment, but, since the screen 42 is located in the film plane, a high-resolution projected image can be obtained and an image from which the pattern of a black matrix has been erased can be viewed. The details of the construction shown in FIG. 13 are similar to those in FIG. 6, but the screen 42 is substituted for the film 25, and the shutter 24, the light measuring device 26 and the exposure control section 27 are not needed.

Figure 14:
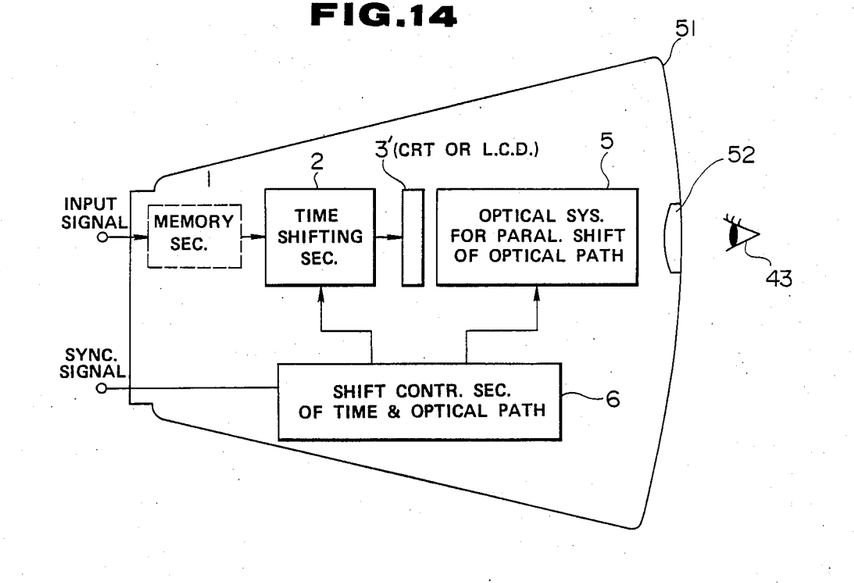
FIG. 14 is a block diagram showing the construction of a third embodiment of the present invention.

FIG. 14 shows a color viewfinder apparatus 51 which is an image projecting apparatus according to a third embodiment of the present invention.

The apparatus 51 is a modified version of the first or second embodiment in that the film 4 or the screen 42 is eliminated. The observer can view a high-resolution image through an eyepiece lens 52 by placing his eye 43 at the position of the film 4 or the screen 42.

The basic construction is identical with that of the photographic apparatus 11 according to the first embodiment, whereby it is possible to view with the naked eye 43 an high-resolution image from which a black-matrix pattern is erased.

Therefore, even if a low-resolution color viewfinder CRT is employed as the display device 3', it is possible to obtain a high-resolution visual image from which a black-matrix pattern is erased. Accordingly, the color viewfinder apparatus 51 can be achieved as a small and high-quality imaging apparatus.

Figure 15:
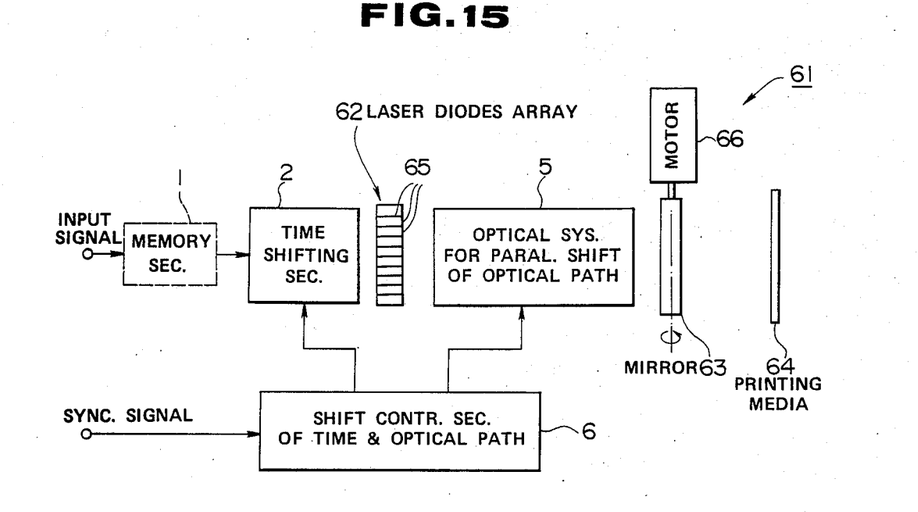
FIG. 15 is a block diagram showing the construction of a fourth embodiment of the present invention.

FIG. 15 shows a video printer apparatus 61 which is an image projecting apparatus according to a fourth embodiment of the present invention.

The video printer apparatus 61 comprises a laser diode array 62 as a light emitting display device in place of the color CRT 3 shown in FIG. 4. Light from the laser diode array 62 is passed through the parallel-shift optical system 5, reflected by a mirror 63 rotated about its rotation axis, and focused onto a printing medium 64 disposed in place of the film 4.

As shown in FIG. 15, the aforesaid laser diode array 62 includes a multiplicity of laser diode elements 65 which are disposed parallel to the rotation axis, and light emitted from each of the laser diode elements 65 is reflected by the mirror 53 which is rotated along its longitudinal axis by the motor 66. Thus, beam spots are projected in a line onto the printing medium 64.

Figure 16:
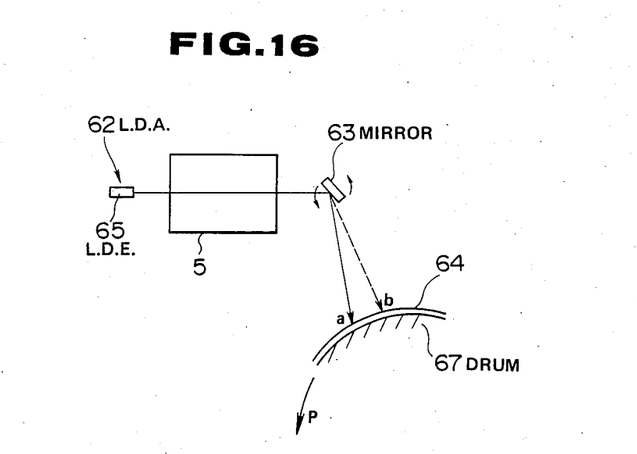
FIG. 16 is a diagrammatic top plan view showing the construction of the fourth embodiment of the present invention.

FIG. 16 is a view taken from the top side of FIG. 15. As can be seen from FIG. 16, the laser diode elements (for example, the uppermost one of the laser diode elements 65 as viewed in FIG. 16) is passed through the parallel-shift optical system 5, reflected by the mirror 73, and projected as a beam spot onto the printing medium 64 disposed on the outer periphery of the drum 67. In this case, it is possible to scan the surface of the printing medium 64 along a line (e.g., from point a to point b) perpendicular to the axis of rotation of the drum 67 by rotating the mirror 63. During the scanning, a luminance signal equivalent to a horizontal video signal is applied to the respective laser diode elements 65 at the same time (if it is assumed that the axis of rotation of the mirror 63 extends parallel to the vertical direction), whereby the printing of a full-frame image is effected by utilizing the rotation of the mirror 63.

The second embodiment can also be used to make color or monochrome hard copies. For example, monochrome hard copies can be made using luminance signals, whereas color hard copies can be made by repeating the same processing for each of three frames corresponding to R, G and B. If it is desired to produce a plurality of copies, the drum 67 may be rotated in frame-by-frame fashion in the direction indicated by an arrow P.

Figure 17:
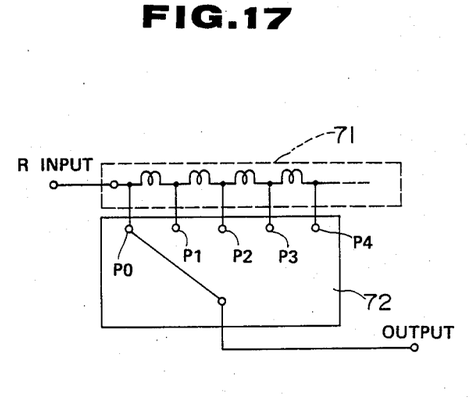
FIG. 17 is a circuit diagram of one example of the time shifting means used in the present invention.

The $\Delta t_k$ delay section 17 which constitutes the time shifting means in each of the above-described embodiments (for example, the first embodiment) may be a delay line 71 with taps, as shown in FIG. 17. Taps P0, P1, P2, P3, ... of the delay line 71 are connected to a multiplexer 72, and the taps P0, P1, P2, P3, ... may be selected by the multiplexer 72 in response to a control signal from the $\Delta t_k \cdot \Delta x_k$ control section 16 to delay a R color signal stepwise with respect to a synchronizing signal. It is to be noted that G and B color signals can also be formed by delay lines with taps which are similar to the delay line shown in FIG. 17.

In place of shifting in time the above R, G and B color signals, the synchronizing signal may be shifted.

It will be appreciated from the foregoing that, in accordance with the present invention, there is provided an image photographing and projecting apparatus comprising means for shifting the time of a video signal in correspondence with the pitch of the picture elements of the display means to thereby shift the relative position of an image formed on a recording medium in correspondence with the amount of shift, whereby it is possible to provide a high-resolution photographic or projected image.

What is claimed is:

1. An apparatus for photographing an image, comprising:
    time shifting means for effecting stepwise time-shifting of the time of one of an input video signal and a synchronizing signal;
    image displaying means for displaying said video signal a plurality of times, each time stepwise time-shifted by said time shifting means on a display screen in the form of an image;
    a focusing optical system for focusing each said image displayed by said image displaying means;
    a recording medium disposed with a sensitizing surface thereof located in a focal plane of said focusing optical system for recording each stepwise time-shifted image; and
    a position shifting means for stepwise shifting, in synchronization with said stepwise time-shifting, a relative position of an image formed on said recording medium with respect to a position of said image displayed by said image displaying means.

2. An apparatus for projecting an image, comprising:
    time shifting means for effecting stepwise time-shifting of the time of one of an input video signal and a synchronizing signal;
    image displaying means for displaying said video signal a plurality of times, each time stepwise time-shifted by said time shifting means on a display screen in the form of an image;
    a projecting optical system for projecting each said image displayed by said image displaying means;
    a screen means disposed with a screen surface thereof located in a focal plane of said projecting optical system for displaying each stepwise time-shifted image; and
    a position shifting means for stepwise shifting, in synchronization with said stepwise time-shifting, a relative position of an image formed on said screen surface with respect to a position of said image displayed by said image displaying means.

3. A viewfinder apparatus, comprising:
    time shifting means for effecting stepwise time shifting of the time of one of an input video signal and a synchronizing signal;
    image displaying means for displaying said video signal a plurality of times, each time stepwise time-shifted by said time-shifting means on a display screen in the form of an image;
    an eyepiece optical system, disposed in opposed relationship with said display screen of said image displaying means, for allowing observation of an object; and
    a position shifting means for stepwise shifting, in synchronization with said stepwise time-shifting, a position of an image displayed on said display screen and observed through said eyepiece optical system.

4. An apparatus according to claim 1, 2 or 3, wherein said time shifting means is comprised of a delay line with taps each having a different amount of delay and a multiplexer for selectively switching over said taps of said delay line.

5. An apparatus according to claim 1, 2 or 3, wherein said image displaying means is a color CRT.

6. An apparatus according to claim 1, 2 or 3, wherein said image displaying means is a laser diode array.

7. An apparatus according to claim 1, 2 or 3, wherein said image displaying means is a liquid crystal display.

8. An apparatus according to claim 1, wherein said recording medium is a film for a still camera.

9. An apparatus according to claim 1 or 8, further comprising control means for controlling an amount of exposure of said film.

10. An apparatus according to claim 1, 2 or 3, wherein said position shifting means comprises two prisms disposed in opposed relationship with each other with a space therebetween, two piezoelectric elements respectively inserted in the space between said prisms at opposite sides thereof and each having a thickness which varies by an application of a voltage, and voltage applying means for applying different levels of voltages to said piezoelectric elements in a stepwise manner.

11. A video projector comprising projecting means including an apparatus according to claim 2.

12. A video printer comprising printing means including a viewfinder apparatus according to claim 3.

* * * * *